(12) United States Patent
Lundquist et al.

(10) Patent No.: US 8,614,268 B2
(45) Date of Patent: Dec. 24, 2013

(54) STABILIZED POLYMER COMPOSITIONS

(75) Inventors: Eric G. Lundquist, North Wales, PA (US); Jian-Yang Cho, Blue Bell, PA (US)

(73) Assignee: Rohm and Haas Company, Philadelphia, PA (US)

( * ) Notice: Subject to any disclaimer, the term of this patent is extended or adjusted under 35 U.S.C. 154(b) by 113 days.

(21) Appl. No.: 12/661,958

(22) Filed: Mar. 26, 2010

(65) Prior Publication Data
US 2010/0267872 A1    Oct. 21, 2010

Related U.S. Application Data

(60) Provisional application No. 61/212,735, filed on Apr. 15, 2009.

(51) Int. Cl.
*C08K 5/02* (2006.01)
*C08K 5/58* (2006.01)
*C08K 5/57* (2006.01)
*C08K 13/00* (2006.01)

(52) U.S. Cl.
USPC ........... 524/181; 524/180; 524/178; 524/182; 524/351; 524/352; 524/357; 525/366; 252/182.14; 252/400.1

(58) Field of Classification Search
USPC ......... 524/180, 397, 181, 178, 182, 351, 352, 524/357; 525/366; 252/182.14, 400.1
See application file for complete search history.

(56) References Cited

U.S. PATENT DOCUMENTS

| 4,681,907 A | 7/1987 | Mesch et al. |
| 5,100,946 A * | 3/1992 | Hung et al. ................... 524/397 |

FOREIGN PATENT DOCUMENTS

| EP | 0107063 | 5/1984 |
| EP | 0 492 803 B1 | 6/1996 |

* cited by examiner

*Primary Examiner* — James J Seidleck
*Assistant Examiner* — Deve E Valdez
(74) *Attorney, Agent, or Firm* — Tifani M. Edwards

(57) ABSTRACT

This invention relates to the thermal stabilization of halogen-containing polymer compositions, more particularly, this invention relates to a poly(vinyl chloride) (PVC) or a chlorinated polyvinyl chloride (cPVC) composition comprising an alkyl tin stabilizer and at least one salt of a polymeric polyacid such as a polycarboxylic acid salt supported on a polymeric material.

4 Claims, No Drawings

STABILIZED POLYMER COMPOSITIONS

This patent application claims the benefit of the earlier filed U.S. Patent application Ser. No. 61/212,735 filed on Apr. 15, 2009 under 37 CFR 1.55(a).

This invention relates to the thermal stabilization of halogen-containing polymer compositions, more particularly, this invention relates to a poly(vinyl chloride) (PVC) or a chlorinated polyvinyl chloride (cPVC) composition comprising an alkyl tin stabilizer and at least one salt of a polymeric polyacid material supported on a polymeric substrate.

It is well known that halogen-containing polymers are normally susceptible to heat-induced deterioration and that the physical properties of such polymers deteriorate and color changes take place during processing at elevated temperatures. Undesirable color changes within the polymer often occur within the first 5 to 15 minutes as well as during later stages of thermal processing. Examples of such polymers are the vinyl and vinylidene polymers in which the halogen is attached directly to carbon atoms. Poly(vinyl chloride), chlorinated polyvinyl chloride, polyvinylidene chloride, chlorinated polyethylene, polyvinylidene fluoride, copolymers of vinyl chloride and poly(vinylidene chloride), are the most familiar polymers which require stabilization for their survival during fabrication into pipe, window profile, siding, bottles, wall covering, packaging film, foamed trim and the like.

A great deal of work has been done in the development of more effective thermal stabilizers and organotin-based heat stabilizers have become one of the most efficient and widely used stabilizers for rigid PVC. However, the high cost of tin metal has significantly impacted the cost performance balance of tin based stabilizers making them less economically attractive. U.S. Pat. No. 5,100,946 seeks to solve the problems of the art by providing a stabilized PVC composition containing a stabilizer and at least one metal salt of a carboxylic acid having at least two carboxyl groups. The reference discloses dibutyl and octyl tin mercaptides and/or alkyl tin mercaptoesters with sulfide bridges combined with disodium adipate salts to produce a stabilized PVC composition. European Patent Application 0107063 discloses the use of sodium citrate salts with a particle size of less than 30 microns can be used to stabilize vinyl chloride polymers. In all of these cases, the sodium adipate and sodium citrate must be ground to a small particle size to obtain good dispersiblity and thus good performance in the PVC formulation. Even with particles ground to less than 30 microns, issues such as haze and compatibility prevent these sodium salts from being used in transparent PVC film applications. Additionally, sodium salts that are crystalline and melt at temperatures above 150 C present additional issues as the use of these materials will lead to plate out in commercial processing operations. Thus a more cost effective and compatible stabilizer would be of significant value for use in the stabilization of halogen containing polymers and copolymers such as PVC.

We have found that the combination of a salt of a polymeric polyacid supported on a polymer such as a polymeric processing aid, polymeric impact modifier, polyvinyl chloride polymer, and an alkyl tin stabilizer improves the performance of the alkyl tin stabilizer and provides a lower cost, higher performance heat stabilizer. Although the use of polymeric polycarboxylate acid salts such as polyacrylic acid sodium salts have been proposed to stabilize polyvinyl chloride and chlorinated polyvinyl chloride in combination with tin stabilizers, it has now been discovered that important performance criteria such as haze, yellowness index and plate out resistance can only be obtained by co-isolating the polymeric polyacid salt on a polymer support.

The performance desired synergistic effect is observed when the polymeric polyacid salt is isolated on a polymer and used in combination with alkyl tin stabilizers and most notably with alkyl tin stabilizers comprising greater than 25% by weight of the mono alkyl tin mercaptan species.

According to one aspect of the present invention, there is provided a stabilized halogen containing polymer composition comprising:

a) greater than 40% by weight of a halogenated polymeric material;
b) 0.01 to 5.0 phr of an alkyl tin stabilizer comprising a mixture of mono alkyl tin stabilizer and dialkyl tin stabilizer wherein the mono alkyl tin stabilizer is greater than 25% by weight of the alkyl tin stabilizer; and
c) 0.01 to 20 phr of a salt of a polymeric polyacid material isolated on a polymer According to a second aspect of the present invention, there is provided a stabilized halogen containing polymer composition comprising:

a) greater than 40% by weight of a halogenated polymer material wherein the halogenated polymer material comprises polymers and copolymers of vinyl chloride, vinyl fluoride, vinylidene chloride, and vinylidene fluoride, and chlorinated polyvinyl chloride, chlorinated polyethylene or mixtures thereof;
b) greater than 0.2 phr of a monoalkyl tin stabilizer; and
c) 0.01 to 20 phr of a salt of a polymeric polyacid supported on a polymer material As used herein by "polymeric polyacid," is meant a polymeric material with a MW greater than 1000 containing 2 or more acidic groups.

As used herein by "alkyl" is meant a hydrocarbon chain

As used herein by "phr" is meant part per 100 parts of halogenated polymer ie. PVC.

As used herein by "PVC composition" is meant a poly(vinyl chloride) (PVC) or a chlorinated polyvinyl chloride (cPVC) composition. Herein, the terms "PVC" and "halogen containing polymeric mixture" or the like are used interchangeably.

As used herein by "hydrocarbyl" is meant a hydrocarbon group containing carbon and hydrogen.

All percentages are weight percentages, and all temperatures are in ° C., unless otherwise indicated. Percentages of mono alkyl tin stabilizer and di alkyl tin stabilizers are represented as weight percentages of the alkyl tin stabilizer species used.

As used herein, by "alkyl tin stabilizers" is meant mixtures of mono and di alkyl tin mercaptans which can be represented by the following formulas:

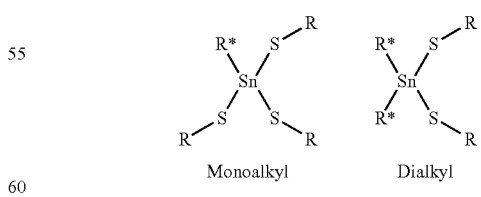

Monoalkyl        Dialkyl where R*=methyl, butyl, octyl, or phenyl hydrocarbyl group, R=is a substituted or unsubstituted hydrocarbyl group, R=R$^1$—O—C(=O)—R$^2$, R=R$^1$—C(=O)—O—R$^3$, where R$^1$ is a $C_1$-$C_{20}$ hydrocarbyl group and R$^2$ is a substituted or unsubstituted hydrocarbyl group and R$^3$ is a substituted or unsubstituted hydrocarbyl group or hydrogen.

The present invention relates to a stabilized halogen containing polymer composition. The stabilized halogen-containing polymer composition comprises a polymeric material wherein the polymeric material comprises a halogen containing polymeric composition, at least one alkyl tin stabilizer, and at least one salt of a polymeric polyacid where the polyacid is a carboxylic acid, sulfonic acid, phosphoric acid, or phosphonic acid having at least two acidic groups.

The polymeric material can be a rigid polymeric material, or a flexible polymeric material plasticized with a non-chlorinated plasticizer. By rigid, it is meant that the polymer contains substantially no plasticizer. By flexible, it is meant that the polymer contains plasticizer. Suitable plasticizers include, but are not limited to, phthalate esters, as well as adipates, azelates, phosphates, and epoxidized oil. A commonly used plasticizer is di(2-ethylhexyl) phthalate (DOP). Other useful plasticizers include tricresyl phosphate, dibutyl phthalate, dibutyl sebacate, tributyl phosphate, epoxidized esters, dioctyl phthalate, trioctyl phosphate, dioctyl sebacate and adipate, and various low-molecular weight polymers such as polypropylene glycol) esters are now widely utilized as plasticizers for the vinyls. The plasticizer content varies widely with the end use of the material, but typically is from 10 to 60 percent by weight.

It is contemplated that the halogen containing polymeric material comprises a poly(vinyl chloride) homopolymer.

Halogen containing polymers which are stabilized include but are not limited to poly(vinyl chloride), chlorinated poly (vinyl chloride) and polyvinylidene chloride with poly(vinyl chloride) homopolymers being favored. The halogen containing polymers can include copolymers with vinyl acetate, vinylidene chloride, methacrylates, acrylates, styrene, dialkyl fumarate or maleate, or other alkyl esters of mono-olefinic acids, as well as blends and alloys with other thermoplastic resins. The halogen containing polymer may include polyvinyl halogen polymer, including the poly(vinyl chloride), although others such as the bromide or fluoride may be used. Also useful are halogenated polyolefins such as chlorinated polyethylene.

In general, halogen containing polymers are vinyl halide polymer compositions including homopolymers of vinyl halide monomers, copolymers of vinyl halide monomers with other monomers and including both block and graft copolymers, and alloys, blends and mixtures of vinyl halide polymers with other polymers.

Useful polymers in the composition of the present invention include: copolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate, methyl acrylate, 2-ethylhexyl acrylate, butyl acrylate, ethyl acrylate and other alkyl acrylates, methyl methacrylate, ethyl methacrylate, butyl methacrylates, hydroxy-ethyl methacrylate and other alkyl methacrylates, methyl alpha chloroacrylate, styrene, vinyl ethers such as vinyl ethyl ether, vinyl chloroethyl ether, vinyl phenyl ether, vinyl ketones such as vinyl methyl ketone, vinyl phenyl ketone, trichloroethylene, 1-fluoro-1-chloro-ethylene, acrylonitrile, chloro-acrylonitrile, allylidene diacetate, chloroallylidene diacetate, and ethylene and propylene.

Polymer blends useful in the present invention include blends of: poly(vinyl chloride) and poly(ethylene), poly(vinyl chloride) and poly(methyl methacrylate), poly(vinyl chloride) and poly(butyl methacrylate), poly(vinyl chloride) and polystyrene; poly(vinyl chloride) and acrylonitrile-butadiene-styrene copolymer, and poly(vinyl chloride) and poly (methyl acrylate).

Polymer blends useful in the practice of this invention can comprise physical blends of at least two distinct polymeric species where one of the polymeric species comprises a matrix or continuous phase of the halogen containing polymer. It is contemplated that the composition of the present invention includes embodiments where the halogen containing polymeric material is 100 percent of the polymeric blend. The non-halogen-containing polymeric material in the polymeric blend may comprise 40% alternatively 25%, or alternatively 10% of the halogen containing polymer composition.

This invention is a formulation comprising from 40 to 99.9% by weight of one or more halogenated polymers and 0.1 to 5% by weight of an alkyl tin stabilizer. In the case of the alkyl tin stabilizer, the formulation comprises a mixture of mono and di alkyl stabilizers in which the mono alkyl tin mercaptan content is greater than 25% by weight. Alternate stabilizer compositions contain greater than 30%, 40%, 50%, 70%, 80% or 90% by weight of mono alkyl tin mercaptan.

Examples of alkyl tin stabilizers useful in the present invention include but are not limited to mono and di methyl tin mercaptans such as mono and dimethyl tin dodecylmercaptides, mono and di octyl tin mercaptans such as mono and dioctyl tin dodecylmercaptides, mono and di butyl tin mercaptans such as mono and dibutyl tin dodecylmercaptides mono and di methyl tin mercaptoesters such as mono and di methyl tin 2-ethylhexyl thioglycolates and reverse mercapto esters such as mono and di methyl tin mercaptoethyloleates and mercaptoethyltallates. Preferred are methyl and octyl tin stabilizers that do not contain sulfide bridges between tin metal centers.

The salts of the polymeric polyacids can be metal salts such as sodium, potassium, calcium, magnesium and lithium or can be amines.

Examples of such salts of a polymeric polyacids include but are not limited to neutralized homopolymers and copolymers of acrylic acid, itaconic acid, maleic anhydride, maleic acid and methacrylic acid with styrene and (meth)acrylic ester monomers. Copolymers such as, for example, polymethylmethacrylate copolyacrylic acid sodium salt, polybutylacrylate copolyacrylic acid sodium salt, polybutylmethacrylate copolyacrylic acid sodium salt, polymaleic acid copolyacrylic acid sodium salt, polystyrene copoly(meth) acrylic acid sodium salt are also useful. The salts of polymers and copolymers of phosphoethylmethacrylate, vinylphosphonic acid and 2-Acrylamido-2-methyl-1-propane sulfonic acid are also useful.

It is preferred that the molecular weight determined using standard size exclusion chromatography with refractive index and matrix assisted laser desorption/ionization mass spectroscopy to determine average molecular weight of the salts of the polymeric polyacids be between 1,000 daltons and 100,000 daltons. Alternative molecular weights of the salts of the polyacids are between 1,000 and 10,000 daltons.

It has been discovered that it is beneficial and preferred that the salt of the polymeric polyacid be supported on a polymer support such as a polymeric processing aid, polymeric impact modifier, or polyvinyl chloride. For example, the salt of the polymeric polyacid may be dissolved in water and then added to an aqueous emulsion of an impact modifier, processing aid or polyvinyl chloride and then spray dried or isolated together to form an intimate powder of polymer support and the salt of the polymeric polyacid. Alternatively, the aqueous solution of the salt of the polymeric polyacid may be blended with the polymer support and the water removed via a drying process. It is our belief that such a process allows the polymeric polyacid to be better dispersed in the mix and more active than using a polyacid salt that has been spray dried alone.

The amount of the alkyl tin stabilizer and salt of a polymeric polyacid may vary to attain the stability required for the particular processing conditions and halogen polymer used. The use of the above polymeric polyacid salt allows the PVC compound to achieve equivalent thermal stability with the use of less tin based stabilizer. It has been found that the amount of alkyl tin stabilizer can be reduced up to 50 percent by weight with equivalent or better stabilization and color retention. Typically, compositions contain from 0.01 to 5.0, alternatively from 0.1 to 3.0, alternatively from 0.1 to 2.0, or alternatively from 0.3 to 1.5 parts per hundred of alkyl tin stabilizer per hundred parts of halogenated polymer Typically, compositions contain from 0.01 to 5.0, alternatively from 0.1 to 3.0, alternatively from 0.1 to 2.0, or alternatively from 0.2 to 1.5 parts per hundred of a salt of a polymeric polyacid, per hundred parts of halogenated polymer.

Typically compositions contain from 0.1 to 20.0 or alternatively from 0.2 to 15.0 parts per hundred of a salt of a polymeric polyacid supported on a polymeric material, per hundred parts of a halogenated polymer.

Tin based stabilizers useful in the present invention can include organotin stabilizers including mercaptide and mercapto-ester based tin stabilizers. Suitable examples of alkyl tin stabilizers useful in the present invention include but are not limited to mono and di alkyl tin mercaptans such as mono and dialkyl tin dodecylmercaptides, mono and di alkyl tin mercaptoesters such as mono and di alkyl tin 2-ethylhexyl thioglycolates and reverse mercapto esters such as mono and di alkyl tin mercaptoethyloleates and mercaptoethyltallates.

Examples of alkyl tin stabilizers useful in the present invention include methyl tin stabilizers and octyl tin stabilizers. Suitable tin stabilizer examples include but are not limited to mono and di methyl tin mercaptans and mono and di octyl tin mercaptans. Suitable methyl tin stabilizers include but are not limited to mono and dimethyl tin dodecylmercaptides, mono and di methyl tin mercaptoesters such as mono and di methyl tin 2-ethylhexyl thioglycolates and reverse mercapto esters such as mono and di methyl tin mercaptoethyloleates and mercaptoethyltallates. Suitable octyl tin stabilizer examples include but are not limited to mono and dioctyl tin dodecylmercaptides, mono and di octyl tin mercaptoesters such as mono and di octyl tin 2-ethylhexyl thioglycolates and reverse mercapto esters such as mono and di octyl tin mercaptoethyloleates and mercaptoethyltallates.

The stabilized halogen containing polymer compositions of the present invention can be compounded for extrusion, injection molding, blow molding and calendaring, and can be formed into such finished articles as fibers, wire and cable, siding, window profiles, foam sheet, pipe, elbows and other pipe fittings, film, sheets and bottles. The stabilized halogen containing polymer compositions can be mixed with other ingredients such as dyes, pigments, flameproofing agents, internal and external lubricants, impact modifiers, and processing aids, blowing agents, fillers and with other additives to prevent, reduce or mask discoloration or deterioration caused by heating, aging, exposure to light or weathering.

The following examples illustrate the present invention. The examples should not be construed as limiting the invention. Parts are parts per hundred parts of resin (phr) unless otherwise indicated.

EXAMPLES

The dynamic stability of the compositions can be monitored with a rheometer, such as a BRABENDER® PLASTI-CORD rheometer or on a 2 roll mill such as a Collin® Mill. The performance of the various stabilizer additive compositions is indicated by Stability Time in minutes. Stability Time can be defined based on a yellowness index of samples taken over a period of time. The sample is put into a sample chamber of the torque rheometer and heats up as the rotors rotate. Initially, a Fusion Time is determined. The Fusion Time is the time for the powder to become molten. The fusion torque is a measure of work at Fusion Time in meter grams. As the sample becomes molten and the viscosity decreases, the torque decreases. The sample achieves an Equilibrium Torque at an Equilibrium time (minutes) which remains substantially constant or slightly decreasing. The composition remains in the molten state as indicated by the Equilibrium Torque value. When the composition begins to crosslink an increase in torque is observed. The term Stability Time is the time the composition begins to degrade or crosslink as shown by an increase in torque above the Equilibrium Torque value minus the Fusion Time.

Molecular weight measurements were conducted on aqueous solutions using standard size exclusion chromatography with refractive index and matrix assisted laser desoption/ionization mass spectroscopy to determine average molecular weights. SEC separations were performed in 20 mM $NaH_2PO_4$ @ 1 ml/min using SEC column set composed of two PLaquagel-OH columns (300×7.5 mm ID) packed with hydrophilic gel (pore size; 30 A, particle size 8 µm) purchased from Polymer Laboratories, part of Varian (Church Stretton, UK). 100 µL of sample were subjected for SEC separation. MALDI-TOF mass spectra were acquired on a Bruker Daltonics Ultraflex instrument equipped with a nitrogen laser ($\lambda$=337 nm). In the MALDI experiment, ~20 mg of IAA was dissolved in 1 ml of $ACN/H_2O$ (1:1) as MALDI matrix. Each of the SEC fractions was premixed with matrix solution at a ratio of 1:20. One µl of the mixture was then placed on the sample target plate and air dried for MALDI-MS analysis.

Non Polymeric Polyacid

Disodium Adipate ground to less than 100 microns

Polymeric Polyacids

Polymer Polyacid A=Acumer™ 1010 is commercially available from the Rohm and Haas Company. It is a 44% aqueous solution of the sodium salt of polyacrylic acid. The average Mw=2,100 daltons with Mn=1,500. pH=7.4

Polymer Polyacid B=copolymer of 82% polyacrylic acid and 18% polybutylacrylate. To a 1000 ml flask equipped with a condenser, nitrogen, thermocouple and stirrer is added 500 grams of isopropanol. The reactor is heated to 78 C and a monomer mixture consisting of 30 grams of isopropanol, 90 grams of acrylic acid, 20 grams of butylacrylate and 2 grams of the initiator t-amylperoxypivalate is fed at a rate of 2 ml/min over a period of ninety minutes. After the completion of the feed, the reaction was heated for 60 minutes at 78 C. After 60 minutes, 1 gram of t-amylperoxypivalate was added and the reaction herated for an additional 6 hours. After the reaction was completed, the isopropanol was removed under vacuum and then the product was neutralized with aqueous sodium hydroxide solution to a pH of 7.2. This 54% solids aqueous solution of polyacrylic acid copolybutylacrylate sodium salt copolymer had a Mw of 2,976 daltons and Mn of 1,521.

Polymeric Polyacid C=spray dried Polymer Polyacid A.

Polymer Supported Polymeric Polyacids

To 1 part of an aqueous acrylic latex of Paraloid™ K-175 at 52.5% solids was added 0.67 parts of a 26% solids aqueous solution of Acumer™ 1010 polyacrylic acid sodium salt. This mixture was fed into a spray drying unit to produce a dry powder of Paraloid™ K-175 containing 25% of Acumer 1010. This powder is referred to as K-175A.

To 1 part of an aqueous acrylic latex of Paraloid™ K-445 at 50.0% solids was added 0.17 parts of a 26% solids aqueous solution of Acumer™ 1010 polyacrylic acid sodium salt. This mixture was fed into a spray drying unit to produce a dry powder of Paraloid™ K-445 containing 8% of Acumer 1010. This powder is referred to as K-445A.

To 1 part of dry Paraloid™ BTA707 was added a 0.023 parts of Acumer™ 1010 polyacrylic acid sodium salt in water (44% solids). This mixture was blended together and air dried to give a dry powder of Paraloid™ BTA-707 containing 1.0% of Acumer™ 1010 polyacrylic acid sodium salt. This powder is referred to as BTA-707A.

To 1 part of a dry polyvinyl chloride polymer was added 0.50 parts of a 44% solids solution of Acumer™ 1010 polyacrylic acid sodium salt. This mixture was blended together and air dried to give a dry powder of PVC containing 18% of Acumer™ 1010 polyacrylic acid sodium salt.

Tin Stabilizers

Following is a listing of tin based stabilizers used in the Examples:

Stabilizer A=90% monomethyltin tri 2-ethylhexylthioglycolate, 10% dimethyltin bis 2-ethylhexylthioglycolate
Stabilizer B=60% monomethyltin tri 2-ethylhexylthioglycolate, 40% dimethyltin bis 2-ethylhexylthioglycolate
Stabilizer C=45% monomethyltin tri 2-ethylhexylthioglycolate, 55% dimethyltin bis 2-ethylhexylthioglycolate
Stabilizer D=27% monomethyltin tri 2-ethylhexylthioglycolate, 73% dimethyltin bis 2-ethylhexylthioglycolate
Stabilizer E=25% monooctyl tin tri ethylhexylthioglycolate 75% dioctyltin bisethylhexylthioglycolate
Stabilizer F=53% monooctyl tin tri ethylhexylthioglycolate 47% dioctyltin bisethylhexylthioglycolate Example 1

Opaque PVC Film

TABLE 1

| PVC Formulation | |
|---|---|
| Solvin K58 PVC (Solvay) | 75 phr |
| Vinylacetate Copolymer | 25 phr |
| Advalube ™ F1060L (Glyceroldioleate, Rohm and Haas Company) | 0.8 phr |
| Advalube ™ E2100 (Pentaerythritol Ester Lubricant, Rohm and Haas Co.) | 0.4 phr |
| Paraloid ™ BTA-736s (MBS Impact Modifier, Rohm and Haas Company) | 6 phr |
| Paraloid ™ K-175 (Acrylic Processing Aid, Rohm and Haas Company) | 0.75 phr |
| Paraloid ™ K-120ND (Acrylic Processing Aid, Rohm and Haas Company) | 0.5 phr |
| Stabilizer | |
| TiO2 | 5 phr |
| K-175 A (Acrylic Processing Aid containing 25% Polymeric Polyacid A | |

To 226.9 grams of the above mixture including the stabilizer was added between the heated 195° C. rollers. The roller speed for the front roller was 26 RPM and the rear roller was 20 RPM. Hot PVC samples were taken from the rollers at the indicated times and the yellowness (indication of thermal stability) measured on a Labscan using ASTM method D-1925. The results are presented in Table 2.

TABLE 2

| | Stabilizer | | | | | |
|---|---|---|---|---|---|---|
| | A | A | B | B | D | D |
| % mono | 90 | 90 | 60 | 60 | 27 | 27 |
| phr | 1.35 | 1.01 | 1.35 | 1.01 | 1.35 | 1.01 |
| Paraloid ™ K-175 | 0.75 | 0 | 0.75 | 0 | 0.75 | 0 |
| Paraloid ™ K-175A | 0 | 1.00 | 0 | 1.00 | 0 | 1.00 |
| Yellowness Index ASTM D-1925) | | | | | | |
| 4 min | 4.11 | 3.65 | 4.05 | 4.07 | 5.06 | 5.26 |
| 8 min | 7.2 | 6.86 | 7.33 | 7.53 | 9.47 | 9.37 |
| 12 min | 41.91 | 10.65 | 42.19 | 11.44 | 42.27 | 14.37 |
| 16 min | | | | 25.65 | | 32.25 |
| 18 min | | 39.92 | | 58.33 | | 58.52 |

Example 2

Clear PVC Film

TABLE 3

| PVC Formulation | |
|---|---|
| Oxy 195F PVC (Occidental Chemical) | 100 phr |
| Advawax 280 (ester lubricant, Rohm and Haas Company) | 0.79 phr |
| Advalube ™ F1060L (Glyceroldioleate, Rohm and Haas Company) | 0.68 phr |
| Advalube ™ E2101 (Pentaerythritol Ester Lubricant, Rohm and Haas Company) | 0.23 phr |
| Paraloid ™ BTA-707 (MBS Impact Modifier, Rohm and Haas Company) | 10 phr |
| Paraloid ™ K-175 (Acrylic Processing Aid, Rohm and Haas Company) | 0.85 phr |
| Stabilizer | |
| Toner | 0.002 |
| Paraloid ™ BTA-707 A (contains 1% Polymeric Polyacid A) | 10 phr |

To 226.9 grams of the above mixture including the stabilizer was added between the heated 195° C. rollers. The roller speed for the front roller was 26 RPM and the rear roller was 20 RPM. Hot PVC samples were taken from the rollers at the indicated times and the yellowness (indication of thermal stability) measured on a Labscan using ASTM method D-1925. Haze measurements were conducted on the HunterLab Color QUEST Sphere with DP-9000. The measurement was done in the transmittance mode using a 2° C. angle light source/observer. The instrument was standardized following the HunterLab standardization procedure. The results are presented in Table 4.

TABLE 4

| | Stabilizer | | | | | |
|---|---|---|---|---|---|---|
| | A | A | B | B | D | D |
| % mono | 90 | 90 | 60 | 60 | 27 | 27 |
| phr | 1.0 | 1.0 | 1.0 | 1.0 | 1.0 | 1.0 |
| BTA-707 phr | 10 | 0 | 10 | 0 | 10 | 0 |

TABLE 4-continued

|  | Stabilizer | | | | | |
| --- | --- | --- | --- | --- | --- | --- |
|  | A | A | B | B | D | D |
| BTA-707 A phr (contains 1% Polymeric Polyacid A) | 0 | 10 | 0 | 10 | 0 | 10 |
| Film haze at 2 min | 6.56 | 8.07 | 6.01 | 5.14 | 5.75 | 6.13 |
| Yellowness Index (ASTM D-1925) | | | | | | |
| 4 min | 7.15 | 7.48 | 8.48 | 10.26 | 11.79 | 10.19 |
| 8 min | 13.14 | 13.63 | 15.20 | 15.22 | 19.71 | 16.37 |
| 12 min | 25.69 | 22.32 | 26.48 | 23.39 | 30.54 | 23.04 |
| 16 min | 58.46 | 39.78 | 58.39 | 38.18 | 55.46 | 34.47 |
| 20 min | 145.68 | 79.81 | 160.69 | 81.72 | 186.59 | 56.47 |
| 24 min |  | 151.48 |  | 161.27 |  | 122.48 |

Example 3

Clear PVC Film

TABLE 5

| PVC Formulation | |
| --- | --- |
| Oxy 195F PVC (Occidental Chemical) | 100 phr |
| Advawax ™ 280 (ester lubricant, Rohm and Haas Company) | 0.79 phr |
| Advalube ™ F1060L (Glyceroldioleate, Rohm and Haas Company) | 0.68 phr |
| Advalube ™ E2101 (Pentaerythritol Ester Lubricant, Rohm and Haas Company) | 0.23 phr |
| Paraloid ™ BTA-707 (MBS Impact Modifier, Rohm and Haas Company) | 10 phr |
| Paraloid ™ K-175 (Acrylic Processing Aid, Rohm and Haas Company) | 0.75 phr |
| Stabilizer | |
| Toner | 0.002 |
| Paraloid ™ K-175A (contains 25% polymeric polyacid A) | |
| Disodium Adipate | |

To 220 grams of the above mixture including the stabilizer was added between the heated 195° C. rollers. The roller speed for the front roller was 26 RPM and the rear roller was 20 RPM. A Hot PVC sample was taken at 4 minutes and yellowness and haze measured. Yellowness (an indication of thermal stability) was measured on a Labscan using ASTM method D-1925. Haze measurements were conducted on the HunterLab Color QUEST Sphere with DP-9000. The measurement was done in the transmittance mode using a 2° C. angle light source/observer. The instrument was standardized following the HunterLab standardization procedure. The results are presented in Table 6.

TABLE 6

|  | Stabilizer | | |
| --- | --- | --- | --- |
|  | D | D | D |
| % mono | 27 | 27 | 27 |
| phr | 1.35 | 1.1 | 1.1 |
| K-175 phr | 0.75 | 0 | 0.75 |
| K-175A phr | 0 | 1.0 | 0 |
| Disodium Adipate | 0 | 0 | 0.25 |
| Film haze at 4 min | 3 | 8 | 27 |
| Yellowness Index at 4 min | 4.2 | 4.3 | 5.3 |

Example 4

Clear PVC

TABLE 7

| PVC Formulation | |
| --- | --- |
| Oxy 195F PVC (Occidental Chemical) | 100 phr |
| Advawax 280 (ester lubricant, Rohm and Haas Company) | 0.79 phr |
| Advalube ™ F1060L (Glyceroldioleate, Rohm and Haas Company) | 0.68 phr |
| Advalube ™ E2101 (Pentaerythritol Ester Lubricant, Rohm and Haas Company) | 0.23 phr |
| Paraloid ™ BTA-707 (MBS Impact Modifier, Rohm and Haas Company) | 10 phr |
| Paraloid ™ K-175 (Acrylic Processing Aid, Rohm and Haas Company) | 0.85 phr |
| Stabilizer | |
| Toner | 0.002 |
| Polymeric Polyacid C | |
| Polymeric Polyacid B | |
| Polymeric Polyacid A | |
| Paraloid ™ K-175A | |

To 226.9 grams of the above mixture including the stabilizer was added between the heated 195° C. rollers. The roller speed for the front roller was 26 RPM and the rear roller was 20 RPM. Hot PVC samples were taken from the rollers at the indicated times and the yellowness (indication of thermal stability) measured on a Labscan using ASTM method D-1925. The results are presented in Table 8.

TABLE 8

|  | Stabilizer | | | | | | | | | | |
| --- | --- | --- | --- | --- | --- | --- | --- | --- | --- | --- | --- |
|  | B | B | B | B | D | D | D* | E | E | F | F |
| % mono | 60 | 60 | 60 | 60 | 27 | 27 | 27 | 25 | 25 | 53 | 53 |
| phr | 1 | 0.75 | 0.75 | 0.75 | 1 | 0.75 | 0.75 | 1 | 0.75 | 1 | 0.75 |
| K-175 phr | 0.85 | 0 | 0.85 | 0.85 | 0.85 | 0 | 0.85 | 0.85 | 0 | 0.85 | 0 |
| K-175A phr | 0 | 1.10 | 0 | 0 | 0 | 1.10 | 0 | 0 | 1.10 | 0 | 1.10 |
| Polymeric Polyacid A (aqueous solution) phr | 0 | 0 | 0.58 | 0 | 0 | 0 | 0 | 0 | 0 | 0 | 0 |

TABLE 8-continued

|  | Stabilizer | | | | | | | | | | |
| --- | --- | --- | --- | --- | --- | --- | --- | --- | --- | --- | --- |
|  | B | B | B | B | D | D | D* | E | E | F | F |
| Polymeric Polyacid B (aqueous solution) phr | 0 | 0 | 0 | 0.46 | 0 | 0 | 0 | 0 | 0 | 0 | 0 |
| Polymeric Polyacid C (spray dried polymeric polyacid A) phr | 0 | 0 | 0 | 0 | 0 | 0 | 0.25 | 0 | 0 | 0 | 0 |
| Yellowness Index ASTM D-1925) | | | | | | | | | | | |
| 4 min | 9.2 | 9.6 | 11.0 | 12.1 | 15.9 | 15.7 | 14.7 | 8.4 | 9.3 | 9.0 | 9.7 |
| 8 min | 15.0 | 16.2 | 20.0 | 18.4 | 22.5 | 26.2 | 25.1 | 17.2 | 19.9 | 15.1 | 17.4 |
| 12 min | 31.3 | 29.6 | 38.1 | 32.8 | 35.3 | 37.3 | 37.7 | 34.9 | 42.3 | 30.0 | 36.2 |
| 16 min | 92.8 | 57.8 | 80.6 | 67.8 | 58.6 | 56.9 | 65.7 | 79.0 | 77.5 | 73.3 | 78.2 |
| 18 min | 156.2 | 79.0 | 130.8 | 100.6 | 99.6 | 71.5 | 109.2 | 132.7 | 102.1 | 108.0 | 98.4 |
| 20 min | 161.5 | 114.1 | 170.7 | 148.0 | 182.3 | 92.3 | 181.4 | 182.7 | 128.0 | 138.5 | 113.2 |

*high haze noted

Example 5

PVC Formulation

TABLE 9

PVC Formulation

| Material | Company | PHR |
| --- | --- | --- |
| PVC (Formolon F614 (K = 59)) | Formosa Plastics | 100 |
| Stabilizer | | |
| Calcium Stearate | Compton | 1.3 |
| Paraffin wax (Amerilube XL165) | American Synthol | 0.8 |
| Oxidized PE wax (*AC-629A) | Honeywell | 0.20 |
| Lubricant (Advalube B3310) | Rohm and Haas | 0.60 |
| Paraloid ™ K175 processing aid | Rohm and Haas | 2 |
| Paraloid ™ K445 processing Aid | | |
| Paraloid ™ K445A processing Aid | | |
| Titanium dioxide (Tiona RCL-4) | Millennium Chemicals | 2.5 |
| Calcium carbonate (Omyacarb UFT) | Omya Inc. | 10 |

To a 190 C heated Brabender Rheometer was charged 65 grams of the PVC formulation. While mixing at 60 rpm and heating at 190 C, hot PVC samples were taken from the mixing bowl at the indicated times and the yellowness (indication of thermal stability) measured on a Labscan using ASTM method D-1925. The results are presented in Table 10.

TABLE 10

|  | Stabilizer | | | |
| --- | --- | --- | --- | --- |
|  | D | D | D | C |
| % mono | 27 | 27 | 27 | 45 |
| phr | 2.5 | 1.88 | 1.75 | 1.63 |
| K-445 phr | 11 | | | |
| K-445A phr | | 11 | 11 | 11 |
| Yellowness Index | | | | |

TABLE 10-continued

|  | Stabilizer | | | |
| --- | --- | --- | --- | --- |
|  | D | D | D | C |
| (ASTM D-1925) | | | | |
| 6 min | 5.2 | 6.1 | 6.4 | 6.8 |
| 12 min | 9.2 | 10.0 | 11.0 | 10.9 |
| 18 min | 14.0 | 13.6 | 15.1 | 15.5 |
| 24 min | 20.8 | 17.6 | 20.7 | 24.7 |

The invention claimed is:

1. A stabilized halogen containing polymer composition comprising:
   a) greater than 40% by weight of a halogenated polymeric material;
   b) 0.01 to 5.0 phr of an alkyl tin stabilizer wherein the alkyl tin stabilizer comprises a mixture of mono alkyl tin stabilizer and dialkyl tin stabilizer wherein the mono alkyl tin stabilizer is greater than 25% by weight of the alkyl tin stabilizer; and
   c) 0.01 to 20 phr of a salt of a polymeric polyacid supported on a polymer material to form the stabilized halogen containing polymer composition.

2. The stabilized halogen containing polymer composition of claim 1 wherein the alkyl tin stabilizer comprises at least one of mono and dimethyl tin stabilizers selected from the group comprising mono and dimethyl tin dodecylmercaptides, mono and di methyl tin 2-ethylhexyl thioglycolate and mono and di methyl tin mercaptoethyloleates or mercaptoethyltallates.

3. The stabilized halogen containing polymer composition of claim 1 wherein the mono alkyl tin stabilizer is greater than 40% by weight of the alkyl tin stabilizer.

4. The stabilized halogen containing polymer composition of claim 1 wherein the salt of the polymeric polyacid material is the salt of either a polyacrylic acid, a polyacrylic acid copolymer, a polymethacrylic acid, or a polymethacrylic acid copolymer.

* * * * *